Jan. 9, 1968  G. B. RICHARDS  3,362,137
VAPOR TRAP AND AIR ELIMINATOR ASSEMBLY
Original Filed Feb. 20, 1964  3 Sheets-Sheet 3
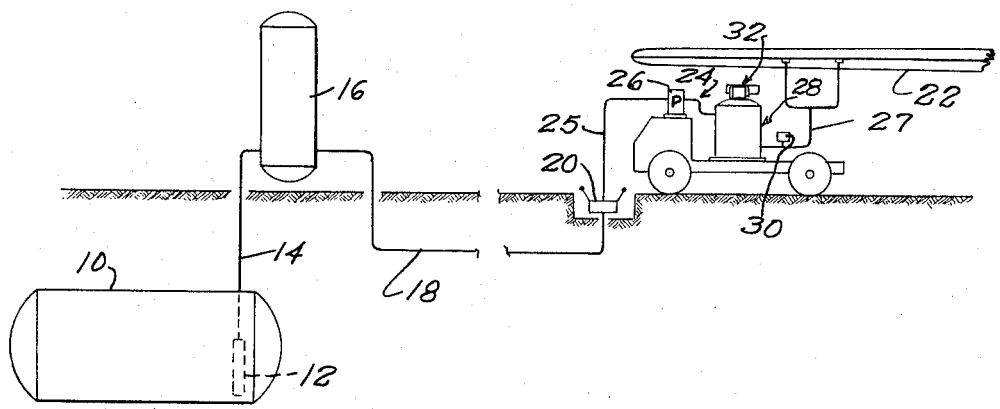
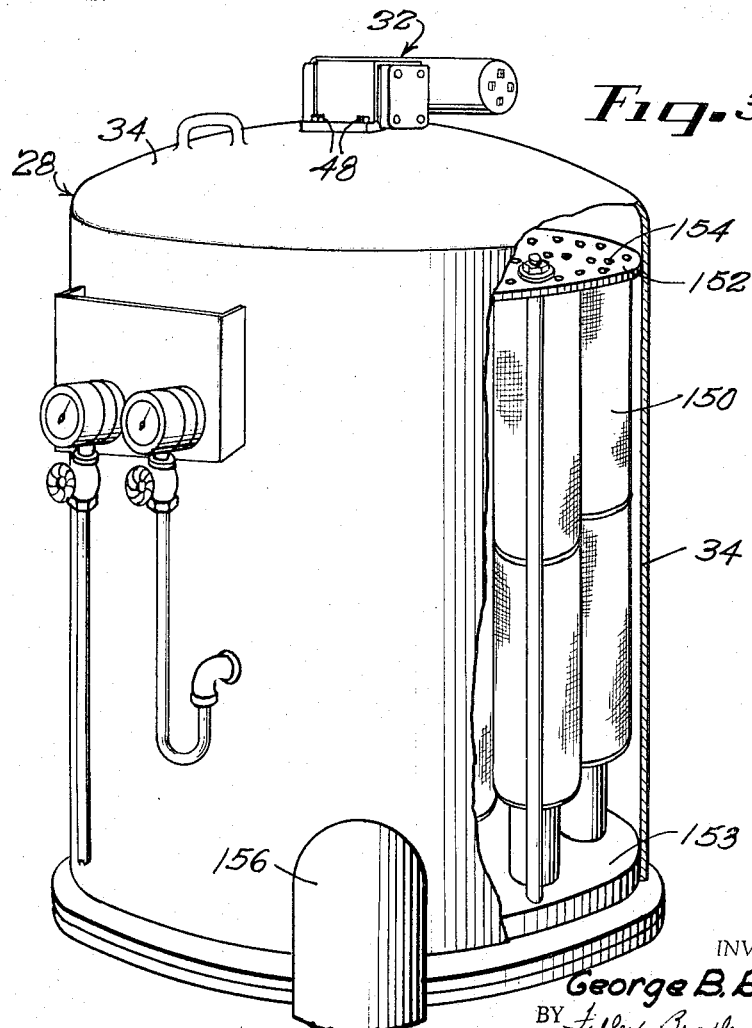
INVENTOR.
George B. Richards
ATTORNEYS

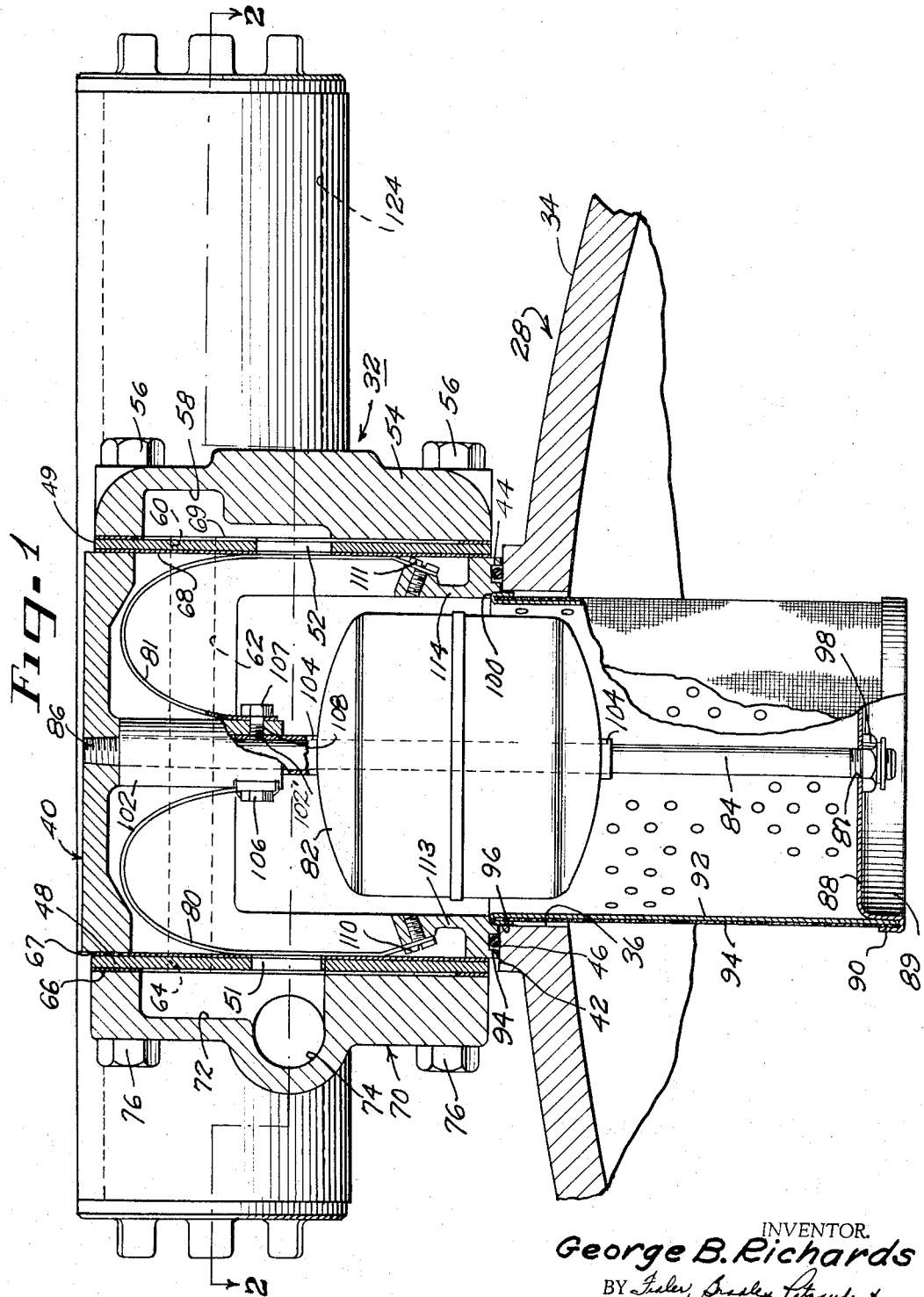

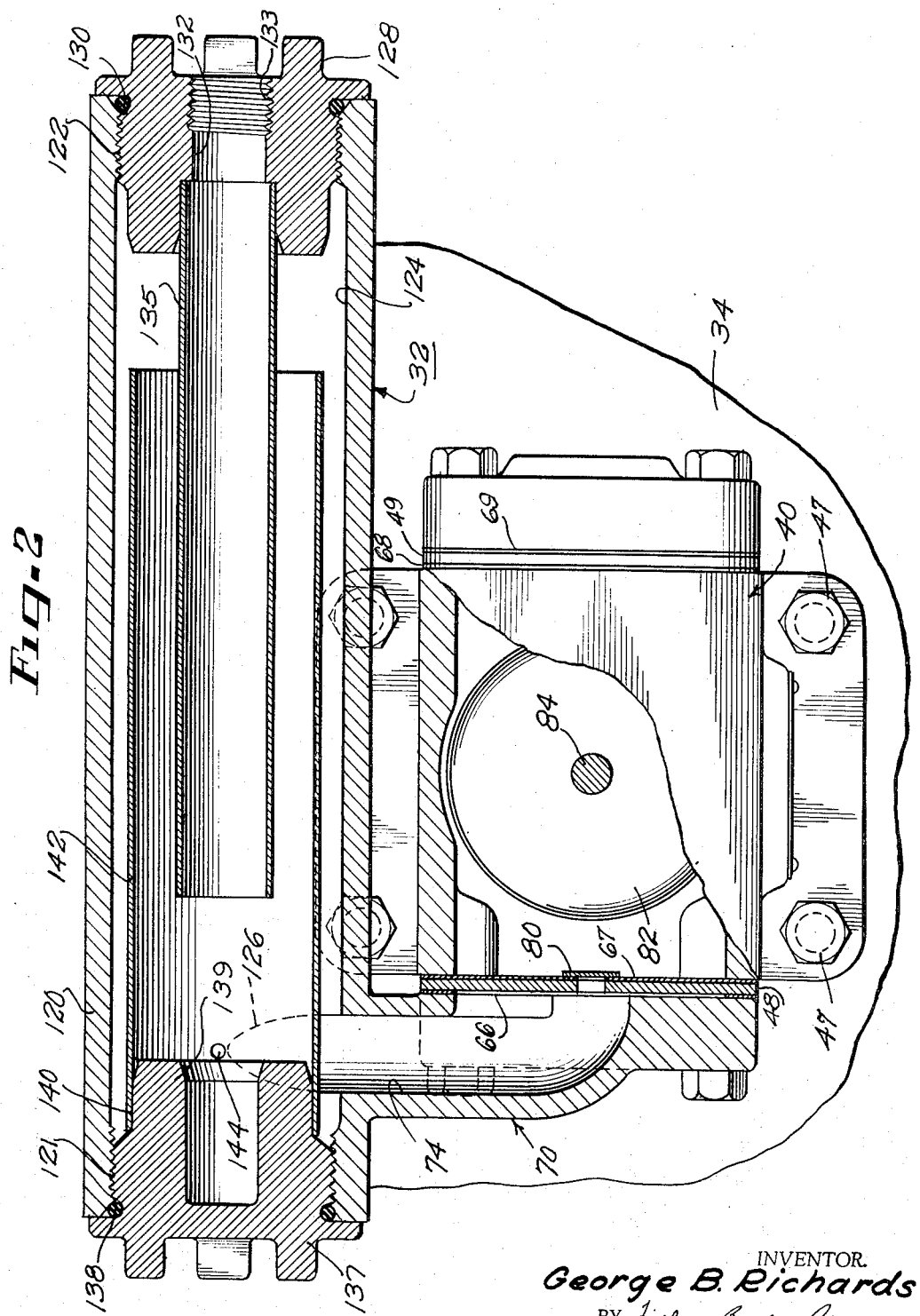

United States Patent Office 3,362,137
Patented Jan. 9, 1968

3,362,137
VAPOR TRAP AND AIR ELIMINATOR ASSEMBLY
George B. Richards, Lake Forest, Ill., assignor to Liquid Controls Corporation, Chicago, Ill., a corporation of Illinois
Continuation of application Ser. No. 346,147, Feb. 20, 1964. This application Dec. 14, 1966, Ser. No. 601,805
8 Claims. (Cl. 55—170)

ABSTRACT OF THE DISCLOSURE

A liquid flow control apparatus for removing air from a liquid supply line includes a pair of vapor separating stages respectively connected upstream and downstream of an air eliminator, the upstream stage being a coalescing media for removing large amounts of liquid from a vapor passing therethrough and the downstream stage being a centrifugal separator for removing lesser amounts of liquid from a vapor passing therethrough to the atmosphere.

---

This is a continuation of application Ser. No. 346,147, filed Feb. 20, 1964, now abandoned.

The present invention generally relates to a combination air eliminator and vapor trap assembly for use in a liquid transmission system, and it more particularly relates to such a device which is primarily adapted for exhausting air or other gases from a pressurized liquid transmission system without expelling any of the liquid to the ambient atmosphere.

Present day multiple engine jet aircraft employ extremely large fuel tanks making it impractical to employ fueling measures which were commonly used with piston type aircraft. Thus, the use of fuel trucks and the like for filling the fuel tanks of airplanes has become outmoded and is being replaced by what is generally referred to as the hydrant refueling system. In this relatively new refueling system one or more fuel supply tanks are connected by underground conduits to the various locations at which the aircraft are adapted to be positioned for refueling. At each of these refueling stations, hydrants are provided and the overall underground system is pressurized by means of pumps strategically placed in the system.

When aircraft fuel tanks are to be filled from a hydrant refueling system, the aircraft is moved to the general location of a hydrant and a transportable hydrant cart is moved to the same area and connected between the hydrant and the fuel tanks of the aircraft by flexible hoses. Mounted on the hydrant cart are various pieces of equipment including, a filter for removing impurities, both solid and liquid, from the fuel as it passes from the hydrant to the aircraft, metering equipment for providing a record of the quantity of fuel supplied to the aircraft, a pump and an air eliminator for removing gases such as air from the fuel. The use of air eliminators in connection with liquid metering equipment is well known to those skilled in the art, and any air which may be present in the underground system is prevented by the air eliminator from passing through the meter and into the aircraft.

Hydrant refueling systems commonly include thousands of feet of underground fuel lines which, for one reason or another, can and often times do contain a substantial amount of air. In such cases, when a hydrant cart is first connected to a hydrant and fuel initially flows from the hydrant into the cart a great amount of air flows into the cart and must be exhausted by the air eliminator. Since refueling time must be kept at a minimum the fuel necessarily passes at a high velocity through the underground conduit to the hydrant and into the cart. The high velocity air thus entrains particles of the liquid fuel forming a mist or vapor. Conventional air eliminators of the type known in the prior art are unsatisfactory for use in such a system for the reason that they exhaust this highly explosive vapor directly into the atmosphere thus creating an extremely hazardous condition in the vicinity of the aircraft being refueled.

It is, therefore, a principal object of the present invention to provide a new and improved air eliminator which incorporates means for preventing the exhaustion of vapor from the associated system.

Another object of the present invention is to provide a new and improved air eliminator including vapor trap means for removing substantially all of the liquid from a vapor being exhausted by the air eliminator from the associated system.

A further object of the present invention is to provide a new and improved air eliminator and a vapor trap assembly for use in connection with hydrant refueling systems.

A still further object of the present invention is to provide a new and improved air eliminator and vapor trap assembly which is efficient in operation and yet compact in size.

A further object of the present invention is to provide a new and improved air eliminator and vapor trap assembly having a relatively small vertical dimension making it suitable for use on a refueling cart or the like.

Briefly, the above and further objects are realized in accordance with the present invention by providing an air eliminator and vapor trap assembly which is adapted to be mounted directly on top of a tank housing a filter medium for removal of foreign matter from the liquid in the associated system. This assembly includes two stages of vapor separation with the control valve portion of the air eliminator interconnected between the separate stages of vapor trap. The first stage is located upstream of the control valve and removes most of the liquid from the vapor. The second stage of the vapor trap incorporates a plurality of centrifugal separating chambers disposed in a substantially horizontal position and which are self draining into the system when the control valve is open. The condensate from both separating stages is returned directly to the filter tank eliminating the need for a separate condensate collecting chamber.

Further objects and advantages and a better understanding of the present invention may be had by reference to the following detailed description taken in connection with the accompanying drawings wherein:

FIG. 1 is a side elevational view partly sectioned to show the internal operating parts of a combined air eliminator and vapor trap assembly embodying the present invention;

FIG. 2 is a view of the device of FIG. 1 partly sectioned along the line 2—2 of FIG. 1, and assuming the entire device to be shown therein;

FIG. 3 is a perspective view showing a combination air eliminator and vapor trap assembly mounted on a filter tank, portions of which tank are broken away to show the internal portions of the filter; and FIG. 4 is a schematic illustration of a hydrant refueling system of the type in which the present invention finds application.

Referring now to the drawings and particularly to FIG. 4 thereof, there is shown a simple hydrant refueling system in which the combined air eliminator and vapor trap of the present invention finds application. It will be understood by those skilled in the art that the present invention is applicable to other types of liquid transmission systems as well as to more complex hydrant refueling systems.

In the system of FIG. 4 one or more underground storage tanks 10 provide a reservoir for the liquid fuel. Mounted in the tank 10 is a submersible pump 12 which pumps fuel from the tank 10 through a conduit 14 and a filter-separator 16 to an underground conduit 18. The filter-separator 16 removes entrained solids and foreign liquids from the fuel before it enters the conduit 18. It will be understood by those skilled in the art that this system may comprise additional storage tanks 10 and pumps 12 and additional underground conduits 18. The particular conduit 18 shown in FIG. 4 is connected to a hydrant 20 located at a point remote from the storage tank 10 and the filter-separator 16. The aircraft to be fueled is shown to be located in the vicinity of the hydrant 20 and a portion of the wing thereof is identified by the numeral 22. A hydrant cart 24 movable to the site of the aircraft is interconnected between hydrant 20 and the fuel tanks which are indicated as being located within the wing 22 by means of flexible hoses 25 and 27. As shown, the cart is positionable beneath the wing of the aircraft and thus the height of the cart and the devices and instruments mounted thereon becomes critical.

The cart 24 supports an auxiliary pump 26 which is connected to the hydrant 20 by means of the flexible hose 25 to assist the pump 12 in forcing the fuel through a filter-separator 28, a meter 30 and up into the fuel tanks of the aircraft through the flexible conduit or hose 27. The pump 26 is adapted to be effectively reversed at the end of a refueling operation to empty the cart and associated hoses of fuel by pumping such fuel back through the hydrant 20 into the underground conduit 18.

The filter-separator 28 is more fully described hereinafter and includes a relatively high cylindrical tank or housing on which the air eliminator and vapor trap assembly 32 of the present invention is directly mounted. The air eliminator thus functions to exhaust air from the fuel before it passes through the meter 30 and thence through the hose 27 into the tanks of the aircraft. Moreover, when the heretofore discussed large amount of vapor passes into the cart the air eliminator and the vapor trap assembly 32 separates the vaporized fuel from the air before exhausting the air into the atmosphere.

Referring now to FIG. 1 only the upper central portion of the filter-separator 28 is shown and the air eliminator-vapor separator assembly 32 is shown mounted directly thereon with a portion of the air eliminator-vapor separator assembly 32 depending into the filter-separator tank 34 through a centrally disposed circular opening 36 at the top thereof. Referring now particularly to FIGS. 1 and 2 it may be seen that the air eliminator and vapor trap assembly 32 includes a first housing member 40 incorporating a downwardly facing annular seat 42 which is provided with an annular groove 44 in which is mounted a resilient sealing gasket 46. A plurality of bolts 47 secure the housing 40 to the tank 34 thereby to compress the sealing gasket 43 and provide a hermetically tight seal between the assembly 32 and the tank 34.

On the opposite sides of the housing 40 adjacent the top thereof are a pair of aligned openings which are substantially closed by a pair of plates 48 and 49. Each of the plates 48 and 49 has an orifice therein designated 51 and 52 respectively. Immediately outside of the plate 49 is an end cap 54 which may be a casting and which is secured to the housing 40 by means of a plurality of hex-head bolts 56. The end cap 54 includes a recess 58 which provides a path of communication between the orifice 52 and a pair of openings 60 in the plate 49. As shown in FIG. 1, the opening 60 are aligned with a pair of passageways 62 which extend through the housing member 40 and which are aligned at their left-hand end with a pair of openings 64 in the plate 48. Each of the plates 48 and 49 is provided with a rubber coating 67, 68 and asbestos gaskets 66 and 69 are respectively provided over the outer faces of the plates 48 and 49 in order to provide the necessary hermetically tight seal between the adjacent parts.

Mounted over the plate 48 is a centrifugal vapor trap or separator housing 70 having a facially disposed recess 72 which provides a path of communication between the openings 64 and the orifice 51 and which further communicates with a passageway 74. The housing 70 is tightly secured to the plate 48 and to the housing 40 by means of a plurality of hex-head bolts 76.

As best shown in FIGS. 1 and 2 the orifices 51 and 52 are preferably quite narrow but of significant length in a vertical direction. For example, the orifices may have a width of ¼ inch and a vertical length of one inch. The rubberized inner faces of the plates 48 and 49 provide valve seats around the orifices 51 and 52 which are adapted to be controllably closed by means of a pair of reed-type valve members 80 and 81 whose positions are controlled by means of a float 82 slideably mounted on a vertically disposed guide rod 84. The rod 84 is connected in a centrally disposed opening in the top of the housing by means of a pipe thread connection 86 thereby to provide a pressure tight seal. The lower end of the rod 84 extends through a central aperture 87 in an inverted cup-like end member 88 having a depending skirt portion 89 which is bent back upon itself to provide an upstanding marginal end portion 90. Between the skirt portion 89 and the marginal end portion 90 of the cap 88 is mounted a rigid, perforated backing sleeve 92 over which is disposed a fine mesh coalescing screen 94. The upper end of the sleeve 92 is bent back upon itself to provide a depending end portion 96 which overlies the upper end of mesh screen 94 to tightly secure it to the backing sleeve 92. A nut 98 is threadedly received over the lower end of the rod 84 and when tightened moves the end cap 88 and the sleeve 92 upwardly so that the upper end of the sleeve 92 is tightly fitted into an annular rabbet 100 in the housing 40.

In order to connect the float 82 to the reeds 80 and 81 there is provided a sleeve block 102 which is secured to a tube 104 which extends through the float 82 and is slideably received on the rod 84. The tube 104 is provided near its upper end within the sleeve 102 with a pair of apertures 102' into which a pair of bolts 106 and 107 extend. The bolts 106 and 107 also extend through suitable apertures provided near the ends of reeds 80 and 81. Accordingly, the bolts 106 and 107 secure the reeds 80 and 81 to the block 102 and also to the guide tube 104 which is suitably secured to the float 82 as by means of welding.

The reeds 80 and 81 extend upwardly from the points of securement to the block 102 and are doubled back upon themselves across the orifices 51 and 52 and secured to the housing 40 by means of a pair of machine screws 110 and 111 which are received in threaded bosses in upstanding arms 113 and 114. Preferably, the arms 113 and 114 have sloping faces, as shown, against which the reeds 80 and 81 are secured thereby to bias the reeds 80 and 81 in a valve closing position against the plates 48 and 49 over the orifices 51 and 52.

It may thus be seen that as the float 82 slides downwardly on the rod 84, the reeds 80 and 81 are respectively moved away from the plates 48 and 49 thereby to open the orifices 51 and 52 to connect the float chamber within the housing 40 to the passageway 74 and thus to the centrifugal vapor trap mechanism.

The housing 70 includes as an integral part thereof a hollow cylindrical portion 120 which is provided with internal threads 121 and 122 at the opposite ends thereof. With the housing 40 mounted in a vertical position as shown in FIG. 1, and with the housing 70 attached thereto as shown in FIGS. 1 and 2, it will be noted that the cylindrical chamber 124 slopes downwardly to the left so that liquid which is trapped or condensed therein will flow under the force of gravity to the left to the passage 74 and thence back through the orifice 51 into the float chamber.

In order to insure the efficient centrifugal flow of the vapor entering the chamber 124 via the passageway 74, the passageway 74 opens into the chamber 124 through a tangentially opening port 126 so as to have a mechanically induced swirl motion around the chamber 124 as it enters therein. A plug 128 is threadedly secured into the right-hand end of the housing 70 and is sealed thereto by means of an O-ring 130. The plug 128 is provided with a central bore 132 which is internally threaded at 133. Accordingly, the plug 128 is adapted to receive a closure plug during shipment and the like to prevent dirt or other impurities from getting into the separator. The bore 132 in the plug 128 is counterbored at the inner end to receive a tube 135 which extends a substantial distance into the chamber 124.

The left-hand end of the chamber 124 is closed by means of an imperforate plug 137 which is threadedly connected to the threads 121. A resilient O-ring 138 is provided for sealing the plug 137 to the housing 70. The plug 137 includes an inwardly extending portion 139 providing a cylindrical seating area 140 on which a cylindrical tube 142 is tightly secured. The tube 142 has an internal diameter substantially greater than the external diameter of the tube 135 and is disposed in concentric relationship therewith. Moreover, as best shown in FIG. 2 the tube 142 overlies the tube 135 by a substantial distance. Accordingly, vapor entering the chamber 124 travels in a helix to the right between the outer wall of the chamber 124 and the outer wall of the tube 142; it then reverses direction and passes to the left between the inner wall of the tube 142 and the outer wall of the tube 135. It again reverses direction and then passes out of the unit through the tube 135. During passage of the vapor through the centrifugal separator assembly the liquid particles are removed therefrom so that only substantially pure air passes out through the tube 135. Any liquid which is collected on the inner walls of the chamber 124 may flow back into the filter tank through the passageway 74 whenever the reeds 80 and 81 are moved to an open position. Moreover, any liquid which collects in the tube 142 or in the tube 135 also drains to the left inasmuch as the tubes 135 and 142 slope downwardly to the left as shown in FIG. 1. Such liquid may drain through a small drain hole 144 near the left hand end of the tube 142 just to the right of the plug 137 and back into the filter tank.

Referring to FIG. 3 the air eliminator-vapor separator assembly 32 is shown mounted on top of a filter separator 28 having a plurality of filter tubes 150 vertically mounted between a bottom plate 153 and a perforate tube plate 152. The liquid flows through perforations 154 in the tube sheet 152 and thence out through tubes 150, which are perforated and thence through an outlet conduit 156 and out of the system. The filter-separator 28 as such forms no part of the present invention and may be of any suitable type. For purposes of illustrating the general environment of the present invention, however, a commonly used filter-separator assembly as employed in hydrant refueling systems is illustrated in FIG. 3. Of importance is the fact that the tube sheet 152 is spaced downwardly from the top of the tank 34 of the filter-separator by a distance greater than the length of the sleeve and screen 92, 94 so that the float 82 may fall downwardly into the tank 34 whenever the tank 34 is not completely filled with liquid. When, however, the tank 34 is completely filled with liquid and hence there is no air or other gaseous medium to be separated from the fuel, the float will occupy the position shown in FIG. 1 and thereby close the orifices 51 and 52 and thus seal the system from the atmosphere. On the other hand, when there is air or other gaseous medium in the fuel line, the natural force of gravity will cause the liquid fuel to fall in the tank 34 and the air or gaseous substance to move to the top whereby the float 82 will fall and open the orifices 51 and 52 so that air may pass out of the system.

Consider now a typical operation of the air eliminator-vapor separator trap assembly of the present invention. When the hydrant cart has first been connected to the hydrant 20 as shown in FIG. 4 and the valves are open to supply fuel to the aircraft the fuel is pumped into the filter separator 28. The fuel in the line 18 will commonly include a substantial amount of air which thus rises to the top of the filter-separator tank 34 causing the float 82 to fall or to remain in the lower position as the case may be. This opens the orifices 51 and 52 and the vapor thus flows through the coalescing screen 94 and through the perforations of the sleeve 92 into the float chamber and out of the float chamber through the orifices 51 and 52. The screen 94 preferably has openings of about .0006 square inch and the material from which the screen is made is preferably Monel. A 40 mesh Monel screen has the desired characteristics. As the vapor passes through the screen 94 most of the liquid particles are removed from the air and fuel mixture and returned directly to the tank 34. An excessive amount of fuel may remain in suspension in the air and as this vapor passes through the separating stages in the separator housing 70 it collects on the walls of the housing and only a substantially liquid free gas passes out through the port 132. After all of the air or other gaseous substance has been removed from the fuel being supplied to the filter-separator tank 34 the fuel level in the tank rises to a sufficiently high level that the float 82 moves to the position shown in FIG. 1 and thus closes the orifices 51 and 52. Thereafter pure fuel is supplied through the tank 34. Should any air get into the system during the fueling operation it collects at the top of the chamber 34 and when the amount of air thus collected exceeds a predetermined amount the corresponding position of the float 82 will again open the orifices 51 and 52 and permit the air to escape to the atmosphere. The reeds 80 and 81 also act in the nature of check valves so that the high pressure within the system maintains the reeds 80 and 81 in the closed position whereby there is no chance of fuel leakage from the system through the air eliminator-vapor trap assembly. When the fueling operation has been completed and the cart 24 is emptied, the float 82 will fall into the partially empty tank 34 thereby opening the orifices 51 and 52 so that any liquid which has been collected in the centrifugal separator portion of the unit will flow back into the separator tank. Accordingly, no separate collecting chamber for the liquid separated from the vapor need be provided. In this way an unlimited amount of fuel may be separated from the air being eliminated from the system since all of the removed liquid flows back into the system.

While the present invention has been described in connection with the particular embodiment thereof it will be understood by those skilled in the art that many changes and modifications may be made without departing from the true spirit and scope of the invention. Therefore, it is intended in the appended claims to cover all such changes and modifications as fall within the true spirit and scope of the present invention.

I claim:

1. In a hydrant refueling system,
   a refueling cart,
   a filter mounted on said cart for removing entrained solids from a liquid fuel pumped therethrough,
   said filter including a tank having a fuel inlet and a fuel outlet, and an opening at the top thereof,
   a combined air eliminator and vapor trap assembly mounted on said tank over said opening,
   said assembly including a finely perforated vapor separator element depending through said opening into said tank and defining therein a float chamber,
   a float disposed in said chamber for vertical disposition in accordance with the level of the liquid in said tank,
   said assembly having an air outlet port therein,
   valve means connected to said float for closing said port when the liquid in said tank is above a predetermined level,
   and a second vapor separator connected over and above said outlet whereby all of the fuel condensed by both said vapor separators may flow by gravity into said tank.

2. An air eliminator and vapor trap assembly comprising
an accumulating chamber,
a first vapor separating stage mounted below said chamber in constant communication therewith,
a second vapor separating stage mounted above said chamber,
a passageway connected between said chamber and said second vapor separating stage,
a valve in said passageway comprising a valve seat and a flexible reed fixedly connected at one end adjacent to said valve seat, and
a float connected to the opposite end of said reed and supported by said first separating stage for opening said valve when the amount of liquid in said chamber is less than a predetermined value in response to the amount of liquid in said chamber.

3. The invention of claim 2 wherein said valve is mechanically balanced and comprises a second flexible reed mounted opposite to the first said reed whereby said reeds exert equal and opposite forces on said float.

4. A combination air eliminator and vapor trap for use in a hydrant type refueling system susceptible to the accumulation of air and vapor in high pressure fuel transmission lines, comprising
a tank having an inlet and an outlet,
means mounted in said tank for removing non-gaseous foreign substances from a liquid fuel supplied thereto,
said tank having an opening at the top thereof,
a housing sealably mounted on said tank over said opening,
a rod mounted in said housing in a vertically oriented position and depending into said tank,
a perforated supporting sleeve secured to said housing and depending into said tank,
said sleeve surrounding said rod,
means securing the bottom of said rod to said sleeve to maintain said rod in a fixed position,
a fine mesh screen mounted on and surrounding said sleeve,
a float slideably supported on said rod for vertical movement in said sleeve under the influence of the level of liquid in said tank,
said housing having a port therein disposed above said tank,
a valve seat surrounding said port,
valve means movable between a closed position against said seat over said port and an open position away from said seat,
means connecting said valve means to said float whereby said valve means is moved by said float to said closed position when said float is elevated to a predetermined upper position when the liquid level in said tank rises and said valve means is moved by said float means to said open position when said float is moved downwardly from said predetermined upper position as the liquid level in said tank falls,
said housing defining an elongated cylinder chamber having the longitudinal axis thereof disposed in a substantially horizontal position,
a passageway connected to said port and opening tangentially into one end of said chamber, the lowest portion of said chamber being disposed above the bottom of said port to permit any liquid collected in said chamber to drain through said port into said tank,
a first tube extending into said chamber from said one end and terminating in spaced apart relationship from the other end of said chamber, the wall of said chamber and said first tube defining a first annular separating chamber,
a second tube extending from said other end of the first mentioned chamber into said first tube and terminating in spaced apart relationship from said one end, said first and second tubes defining a second annular separating chamber, whereby vapor entering said first annular chamber from said passageway travels in a spiral from said one end to said other end in the annular space between the inner wall of said first mentioned chamber and the outer wall of said first tube and then travels toward said one end in the annular space between said first and second tubes, and
means defining an outlet port opening from said second tube only.

5. Apparatus of the type described, comprising
a pressurizable liquid transmission system including an accumulating chamber for separating and collecting gases contained in the liquid being transmitted and having a gas outlet at the top and a liquid inlet disposed below said outlet,
a valve mounted above said chamber and including a valve member movable between a closed position covering said gas outlet and an open position remote from said outlet,
means responsive to the level of liquid in said chamber for opening said valve when said level of liquid is less than a predetermined value,
means independent of said level of liquid in said chamber for opening said valve when the pressure within said chamber is less than atmospheric pressure by a predetermined amount, and
vapor separating means mounted above said chamber and connected between said outlet and the atmosphere, said separating means providing a continuously open passageway between said outlet and the atmosphere,
whereby said chamber is vented to the atmosphere through said gas outlet and said separating means whenever said level of liquid is less than said predetermined value, and any liquid collected in said separating means may drain under the force of gravity into said chamber.

6. In a hydrant refueling system of a type wherein large quantities of air are intermittently passed therethrough,
an air eliminator and vapor trap combination for exhausting substantially vapor free air from said system irrespective of the quantity of air being exhausted, comprising
a tank having a fuel inlet and a fuel outlet connected in series in said system,
means defining a float chamber open at the bottom and mounted over said tank,
a coalescing media interposed between said chamber and the upper portion of said tank,
an outlet at the top of said float chamber,
valve means for opening and closing said outlet,
float means mounted in said chamber for closing and opening said valve means as the level of liquid in said chamber goes up and down, and
a vapor separating means mounted over said float chamber and connected to said outlet for removing small amounts of liquid fuel entrained in the air passing out of said float chamber through the outlet thereof.

7. An air eliminator and vapor trap assembly comprising,
an accumulating chamber,
a first vapor separating stage mounted below said chamber in constant communication therewith,
a second vapor separating stage mounted above said chamber,
a passageway connected between said chamber and said second vapor separating stage,
a valve in said passageway, and
means responsive to the amount of liquid in said chamber for opening said valve when the amount of liquid in said chamber is less than a predetermined value, said means comprising a float, and said valve comprising a valve seat and a flexible reed fixedly connected at one end to said float and fixedly connected at the other end adjacent said valve seat.

8. An air eliminator and vapor trap assembly comprising, an accumulating chamber, a first vapor separating stage mounted below said chamber in constant communication therewith, a second vapor separating stage mounted above said chamber, a passageway connected between said chamber and said second vapor separating stage, a valve in said passageway, and means responsive to the amount of liquid in said chamber for opening said valve when the amount of liquid in said chamber is less than a predetermined value, said means is a float and said valve comprises a valve seat and a first flexible reed fixedly connected at one end to said float and fixedly connected to the other end adjacent said valve seat, said valve being mechanically balanced and including a second flexible reed means mounted opposite to said first reed whereby said reeds exert equal and opposite forces on said float.

References Cited
UNITED STATES PATENTS

| | | | |
|---|---|---|---|
| 634,470 | 10/1899 | Marks | 210—422 |
| 1,631,454 | 6/1927 | Bambach et al. | 55—170 |
| 2,034,914 | 3/1936 | Lanser | 55—160 |
| 2,869,570 | 1/1959 | Wilkerson | 137—204 |
| 2,929,503 | 3/1960 | Ambruster et al. | 210—120 |

REUBEN FRIEDMAN, *Primary Examiner.*

J. ADEE, *Assistant Examiner.*